(12) United States Patent
Jager et al.

(10) Patent No.: US 6,854,357 B2
(45) Date of Patent: Feb. 15, 2005

(54) CONNECTING ROD OF A CRANK MECHANISM

(75) Inventors: Stefan Jager, Schusselfeld (DE); Norbert Radinger, Nuremberg (DE); Matthias Fick, Schnalllach (DE)

(73) Assignee: Ina-Schaeffler KG (DE)

( * ) Notice: Subject to any disclaimer, the term of this patent is extended or adjusted under 35 U.S.C. 154(b) by 91 days.

(21) Appl. No.: 10/226,832

(22) Filed: Aug. 23, 2002

(65) Prior Publication Data

US 2003/0037637 A1 Feb. 27, 2003

(30) Foreign Application Priority Data

Aug. 24, 2001 (DE) .......................... 101 41 653

(51) Int. Cl.[7] .......................... G05G 1/00; B23P 17/00
(52) U.S. Cl. .................... 74/579 E; 29/888.09
(58) Field of Search .................. 74/579 R, 579 E; 29/888.09; 123/90.61; 180/312

(56) References Cited

U.S. PATENT DOCUMENTS

| 800,592 A | * | 9/1905 | Phillips et al. .......... 384/268 |
| 1,176,301 A | | 3/1916 | Layman |
| 1,249,825 A | * | 12/1917 | Putnam .................. 29/888.092 |
| 4,369,742 A | * | 1/1983 | Everts .................. 123/193.6 |
| 4,691,590 A | * | 9/1987 | Geringer et al. .......... 74/579 E |
| 5,787,763 A | * | 8/1998 | Fatehpour et al. ........ 74/579 E |
| 5,862,719 A | * | 1/1999 | Kono .................... 74/579 E |
| 6,457,380 B1 | * | 10/2002 | Aazizou et al. .......... 74/579 E |

FOREIGN PATENT DOCUMENTS

| DE | 3801802 | | 5/1990 | |
| FR | 2765503 | | 1/1999 | |
| JP | 57-173610 | * | 10/1982 | ............ 74/579 E |

* cited by examiner

*Primary Examiner*—Vinh T. Luong
(74) *Attorney, Agent, or Firm*—Muserlian, Lucas and Mercanti

(57) ABSTRACT

A connecting rod of a crank mechanism is made as a single sheet metal part by shaping without chip removal out of sheet metal. The connecting rod comprises a base sheet (1) that is provided with an upper connecting rod eye (2) and a lower connecting rod eye (3). Each of the connecting rod_eyes (2, 3) has an integral cylindrical stamping (6, 7). The connecting rod further comprises a stiffening collar (8) that is integrally formed out of the base sheet (1) and is configured without interruption on the periphery of the base sheet (1).

6 Claims, 1 Drawing Sheet

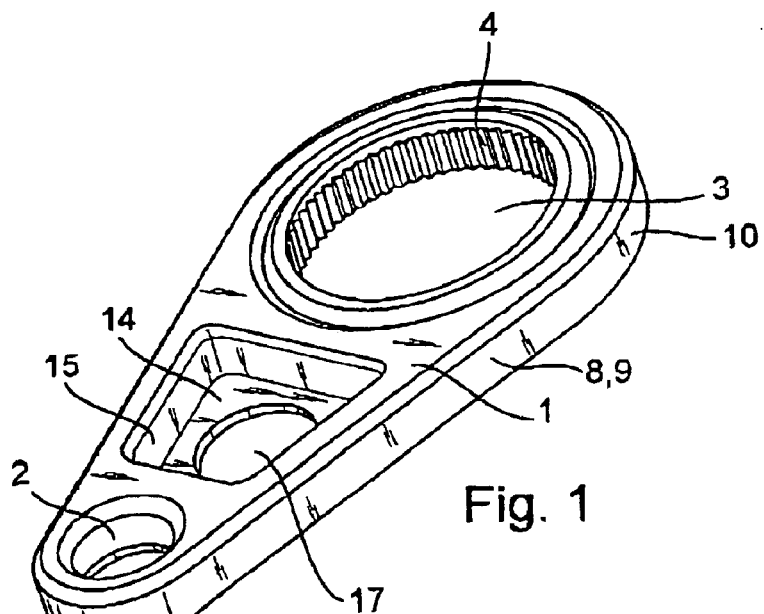
Fig. 1
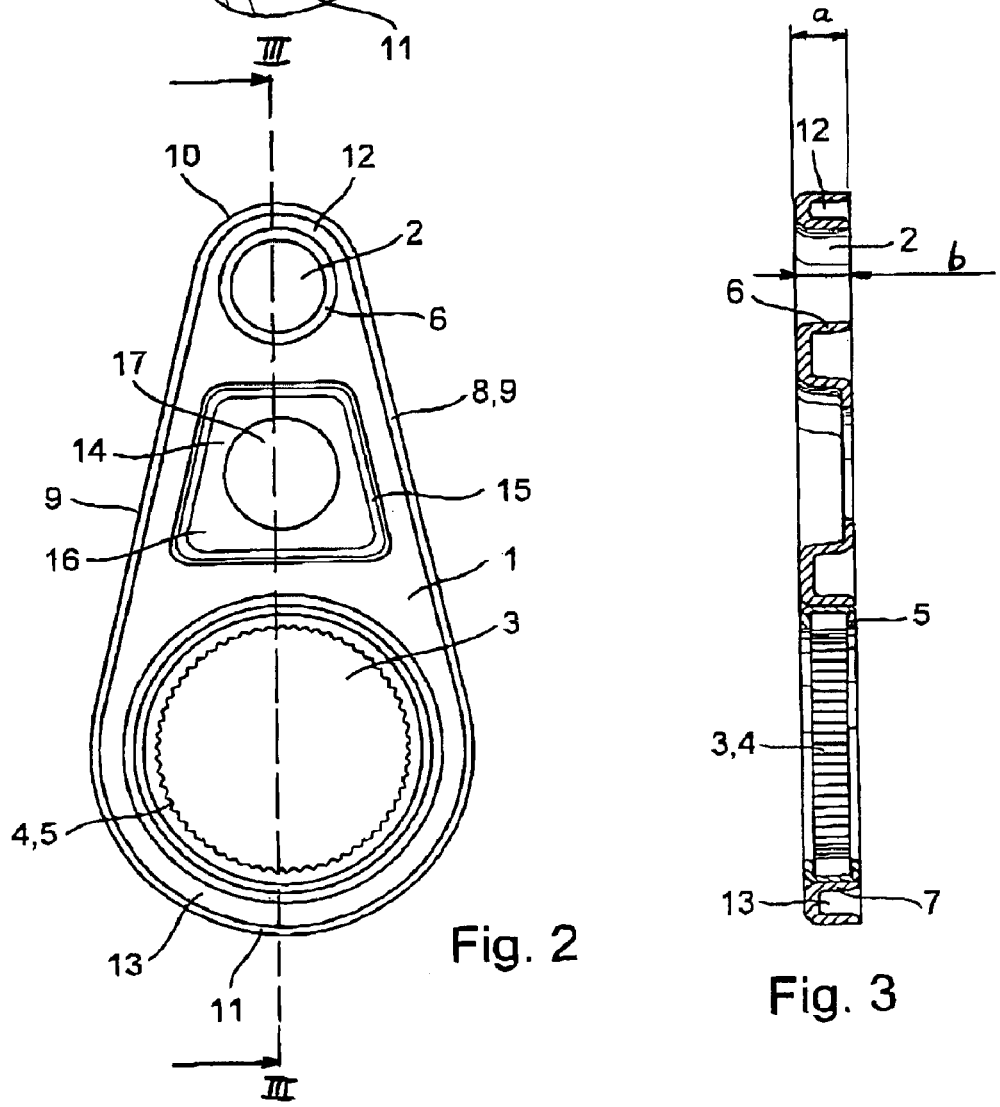
Fig. 2
Fig. 3

CONNECTING ROD OF A CRANK MECHANISM

FIELD OF THE INVENTION

The present invention concerns a connecting rod of a crank mechanism. Connecting rods are usually mounted with their lower connecting rod eye for rotating on a crank and are pivotally connected through their upper connecting rod eye, for example, to a piston.

BACKGROUND OF THE INVENTION

DE 38 01 802 C2, for example, discloses a connecting rod for an axial piston compressor. The connecting rod is made of shaped sheet metal whose base sheet comprises deep drawn cylindrical stampings for the connecting rod eyes on both ends. A bearing bushing is inserted into each connecting rod eye and the cylindrical stamping overlaps only a part of the axial length of the bushing. Reinforcing beads are also provided to impart increased stiffness to the connecting rod in defined sections. However, along a straight line extending transversely of a central longitudinal axis of the connecting rod, the base sheet is not shaped. Bending can occur more easily along the straight line extending transversely of the central longitudinal axis of the connecting rod than in the sheet sections in which the cylindrical stamping or the bead is formed by shaping. This bending ability reduces edge pressure in a desired manner.

Due to these intended bending regions, these prior art connecting rods are not suitable for applications that require connecting rods that have a light weight and an adequate stiffness at the same time.

OBJECTS OF THE INVENTION

It is an object of the invention to provide a connecting rod of a crank mechanism, which connecting rod should be made as a single sheet metal part by shaping without chip removal out of sheet metal, with the base sheet being provided with an upper connecting rod eye and a lower connecting rod eye, each eye having an associated cylindrical stamping.

Another object of the invention is that the connecting rod should have a light weight, be simple and economic to manufacture and possess an adequate overall stiffness.

These and other objects and advantages of the invention will become obvious from the following detailed description.

SUMMARY OF THE INVENTION

The invention achieves the above objects by the fact that a stiffening collar is integrally formed out of the base sheet to extend without interruption around the entire periphery of the base sheet. In contrast to prior art connecting rods, there are no regions in the connecting rod of the invention that may be easily or intentionally bendable. Due to the fact that the stiffening collar is uninterrupted, an adequate stiffness is guaranteed about every bending axis. Preferably, the stiffening collar is formed on the peripheral edge of the sheet metal part. This assures that no protruding parts of the base plate can be bent under any force that may be applied thereto from the outside.

The axial dimensions of the cylindrical stamping and the stiffening collar are configured at least approximately equal to each other, preferably, however, they are equal to each other. The equal axial dimensions permit the use of a simple shaping tool, for instance, for deep drawing.

The entire connecting rod can be made in a particularly economic manner by deep drawing. All that is required is to place a pre-cut piece of sheet metal in the deep drawing die and draw the connecting rod into shape in a single step.

To obtain a further saving of weight, it is appropriate to provide a preferably circular hole in the base sheet between the two connecting rod eyes.

Due to its simple and inexpensive manufacture and its light weight coupled with high stiffness, the connecting rod of the invention is particularly well suited for use in the drive of a blade of a hedge trimmer.

The invention will now be described more closely with reference to one example of embodiment of the invention illustrated in the three appended figures.

BRIEF DESCRIPTION OF THE DRAWINGS

FIG. 1 is a perspective representation of a connecting rod of the invention,

FIG. 2 is a view of the connecting rod of the invention of FIG. 1, and

FIG. 3 is a longitudinal section of the connecting rod of the invention of FIG. 1 taken alone lines III—III of FIG. 2.

DETAILED DESCRIPTION OF THE DRAWINGS

The connecting rod of the invention illustrated in FIGS. 1 to 3 is made out of sheet metal by deep drawing out of a single piece of sheet metal. The connecting rod comprises a base sheet 1 comprising an upper connecting rod eye 2 and a lower connecting rod eye 3. The lower connecting rod eye 3 comprises a rolling element crown ring 4 for enabling a perfect mounting of this connecting rod on a crank, not shown. An outer ring 5 of the rolling element crown ring 4 is pressed into the lower connecting rod eye 3.

Each of the connecting rod eyes, 2 and 3, comprises a cylindrical stamping 6, 7 that is formed integrally on the base sheet 1. These stampings 6, 7 form cylindrical mountings that, as described above, can receive, for instance, a rolling element crown ring.

Starting from the bottom plane of the base sheet 1, a stiffening collar 8 is formed integrally on the peripheral edge of the sheet metal part. The stiffening collar 8 has a continuous, uninterrupted configuration and is arranged symmetrically on either side of a central longitudinal plane in which the center points of the connecting rod eyes 2, 3 are also situated. However, asymmetrical configurations of the stiffening collar 8 are also possible. The stiffening collar 8 is made up of four sections that are integrally connected to each other, viz., two straight sections 9 and two arc-shaped sections 10, 11.

As best seen in FIGS. 2 and 3, annular beads 12 and 13 are formed respectively between the arc-shaped section 10 and the cylindrical stamping 6, and between the arc-shaped section 11 and the cylindrical stamping 7. These beads serve to further stiffen the connecting rod of the invention and are made possible due to the fact that the arc-shaped sections 10, 11 and the cylindrical stampings 6, 7 are arranged very close to each other.

A further, quadrangular stamping 14 is made in the base sheet 1 between the two connecting rod eyes 2, 3. This quadrangular stamping 14, with its four walls 15, increases the stiffness of the connecting rod of the invention. The bottom 16 of the quadrangular stamping 14 comprises a circular hole 17 which serves to further reduce the weight of the connecting rod of the invention.

All the stampings and the stiffening collar 8 are angled in the same direction at 90° starting from the base sheet 1.

What is claimed is:

1. A connecting rod of a crank mechanism, which connecting rod is made as a single sheet metal part by shaping without chip removal out of sheet metal, a base sheet of the connecting rod comprising an upper connecting rod eye and a lower connecting rod eye, a cylindrical stamping being associated to each of the upper and the lower connecting rod eyes, wherein a stiffening collar is integrally formed out of the base sheet to extend without interruption around an entire periphery of the base sheet and an axial dimension of the cylindrical stamping and an axial dimension of the stiffening collar are equal to each other.

2. A connecting rod of claim 1, wherein the stiffening collar is integrally formed on a peripheral edge of the sheet metal part.

3. A connecting rod of claim 1 made by deep drawing.

4. A connecting rod of claim 1, wherein a hole is arranged in the base sheet between the upper connecting rod eye and the lower connecting rod eye.

5. A connecting rod of claim 4, wherein the hole is a circular hole.

6. A method of forming a connecting rod of claim 1 comprising integrally forming by shaping without chip removal a stiffening collar extending without interruption around the entire periphery out of a base sheet of the connecting rod comprising an upper connecting rod eye and a lower connecting rod eye wherein the axial dimension of the base sheet and the stiffening collar are equal to each other.

* * * * *